US006340163B1

(12) United States Patent
Newman

(10) Patent No.: US 6,340,163 B1
(45) Date of Patent: Jan. 22, 2002

(54) SNAG-RESISTANT CHUCK KEY

(76) Inventor: Brady John Newman, 8155 Watt Ave., #169, Antelope, CA (US) 95843

( * ) Notice: Subject to any disclaimer, the term of this patent is extended or adjusted under 35 U.S.C. 154(b) by 0 days.

(21) Appl. No.: 09/724,920

(22) Filed: Nov. 28, 2000

(51) Int. Cl.[7] .......................... B25B 13/44; B23B 31/06
(52) U.S. Cl. ............................ 279/147; 81/16; 279/149
(58) Field of Search ................................ 279/147, 149; 81/16, 436, 460

(56) References Cited

U.S. PATENT DOCUMENTS

| | | | | | |
|---|---|---|---|---|---|
| 224,119 | A | | 2/1880 | Whiton | |
| 709,014 | A | | 9/1902 | Jacobs | |
| 2,320,679 | A | * | 6/1943 | Taylor | 81/436 |
| 2,552,694 | A | | 5/1951 | Stoner | |
| 4,462,728 | A | * | 7/1984 | Sturgis | 279/147 |
| 4,534,573 | A | | 8/1985 | Somers | 279/147 |
| 4,652,001 | A | | 3/1987 | Rathbun et al. | 279/149 |
| 4,986,554 | A | | 1/1991 | Rathbun | 279/149 |

FOREIGN PATENT DOCUMENTS

| | | | |
|---|---|---|---|
| GB | 2050899 | * | 1/1981 |

* cited by examiner

*Primary Examiner*—Steven C. Bishop

(57) ABSTRACT

A chuck key of the type having an elongated cylindrical handle (12) that is used to apply torque to a chuck engaging gear (10) at one end of the handle. The chuck key is smooth, with a cylindrical abbreviated curve formed at the gear end, and without protrusions such that no feature of the key is prone to snagging. A smooth elastomeric chuck key holder (14) is attached in frictional engagement to the handle, and is used to tether the chuck key to an electric drill's power cord.

4 Claims, 1 Drawing Sheet

SNAG-RESISTANT CHUCK KEY

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND

1. Field of Invention

This invention relates to chuck keys, specifically to such keys used to operate the jaws of a chuck that is normally associated with a hand held electrically driven drill 2. Description of Prior Art In order to accommodate various rotary tools that may be inserted within the jaws of a chuck in a hand held electrically driven drill means are provided to adjust the opening defined by the jaws. The chuck is ordinarily adjusted by means of a chuck key that normally has a spindle with an associated circular bevel gear. The spindle of the key is engaged into one of a series of radial sockets in the body of the chuck and the key rotated by means of a handle, with the bevel gear on the key engaged to a circular rack gear of the chuck. Rotation of the key opens or closes the jaws of the chuck and thereby facilitates changing the tool clamped in the jaws. Commonly, means are provided on the drill or its power cord to house or suspend the key for ready access.

Various shapes of chuck keys are proposed in the prior art, though the spindle and pinion gear elements have remained basically the same. U.S. Pat. No. 224,119 to Whiton (1880) discloses a "T" shaped chuck key and U.S. Pat. No. 2,552,694 to Stoner (1951) shows a modified "T" shaped key. U.S. Pat. No. 4,534,573 to Somers (1985) and U.S. Pat. No. 4,652,001 to Rathbun (1987) show "L" shaped keys. U.S. Pat. No. 4,133,543 to Johnson (1979) and U.S. Pat. No. 4,467,677 to Grifford (1984) disclose triangle and cross-shaped chuck keys respectively. Although operably adequate and inexpensive to manufacture, these chuck keys have several shortcomings.

Typically, chuck keys have the undesirable tendency to snag. This problem is especially prevalent with chuck keys attached, often by means of a tether, to a drill's power cord. Snagging occurs when the lips, edges, or angles that define these chuck keys catch on surrounding work site obstructions. A chuck key trolled from a length of power cord will tend to hook adjacent objects much the way a hook on a fishing line will snag the things in its path. There is a possibility of a snag each time a drill is picked up or moved.

An unexpected snag such as this can be hazardous. A drill can be pulled from an operator's hand or the operator can be thrown off balance. This can be particularly dangerous to an operator working from a ladder or scaffold. Recent statistics show that falls are the leading cause of death in the construction industry—the three leading fatal falls from higher levels being from roofs, scaffolding, and ladders as revealed by Bureau of Labor Statistics, US Dept. of Labor, in cooperation with State and Federal Agencies, Census of Fatal Occupational Injuries, 1994; and "Issues", Labor Statistics, Summary 96-1 January 1996, a publication of the US Dept. of Labor, Bureau of Labor Statistics. In this situation, individuals below the operator are also put at risk. These work persons or pedestrians can be injured from a falling drill that has been pulled from the hand of an operator. Loose tools and materials can be snagged and pulled over the edge of a working platform, similarly risking injury to those below. Open containers of paint or other liquid can also be snagged and tipped over. Furthermore, these falling or otherwise disturbed objects can damage nearby materials or personal property.

Chuck key snag-related mishaps take their toll economically and emotionally. The cost of repairing or replacing items damaged due to snags can be considerable. Financial compensation for snag-related injury can also be overwhelmingly expensive. Falls and falling objects are two of the three leading causes of workplace injuries, accounting for 86% of the $38.7 billion in direct workers-compensation costs paid in 1998 as revealed by Liberty Mutual Workplace Safety Index. Heightened anxiety over the anticipation of these occurrences and the potential liabilities involved can be unnerving and distract the operator from the work at hand. Efficiency is reduced and frustration is increased with repeated chuck key snags, thus hampering productivity.

Additionally, repeated snagging forces the tether down the power cord, eventually leaving the chuck key out of convenient reach of the operator. Moreover, this action also causes premature wear and failure of the tether.

Typically, chuck keys are rotated with the fingers and thumb to clench a chuck's jaws about the shaft of a rotary tool. The chuck's grip on the tool must be strong for effective operation. Operators with limited digital strength are hindered in achieving a sufficient grip on the tool. If the operator experiences soreness or fatigue in one or more of the fingers, or if the hand is cold or gloved, manipulating the key effectively becomes even more difficult. Should a rotary tool subsequently become loose in a chuck while in use, the tool and/or the chuck can be damaged. Therefore, chuck manufacturers recommend the time-consuming procedure of using the key in each of the chuck's sockets to insure a firm hold on the tool. Loosening the chuck after this can be arduous. Considerable time is lost in the opening and closing of the chuck when the work at hand requires the use of multiple chuck mounted tools.

There are still other undesirable qualities of typical chuck keys. Operators who opt to keep the chuck key off the power cord and in a tool pouch, often discover the key has become lost amongst other articles at the bottom of the pouch. Also, while using the key, it is necessary for the operator's fingers to move precariously close to the exposed moving gears of the key and chuck.

SUMMARY

In accordance with the present invention, a drill chuck key comprises a smooth elongated cylindrical handle having a curved, geared end and an elastomeric tethered chuck key holder.

OBJECTS AND ADVANTAGES

Accordingly, several objects and advantages of the present invention are:

(a) to provide a chuck key that, when tethered to a drill's power cord, allows for snag resistant movement about a work site;

(b) to provide a chuck key that, when tethered to a drill's power cord that must often be pulled, resists the tendency to disturb tools and other materials or to pull them off the edge of working platforms;

(c) to provide a chuck key that will minimize the possibility of snag related injury;

(d) to provide a chuck key that will minimize the possibility of snag related property damage;

(e) to provide a chuck key that allows for increased productivity and lessened frustration in the absence of repeated snags.

(f) to provide a chuck key that, when tethered to a drill's power cord, resists the tendency to travel down the cord away from the operator;

(g) to provide a chuck key that, when tethered to a drill's power cord, resists premature wear and failure of the tether;

(h) to provide a chuck key that can be securely gripped in the palm of the hand, resulting in increased comfort and greater manipulative leverage when actuating the jaws of a chuck;

(i) to provide a chuck key that can be readily gripped and manipulated even when the operators fingers are cold, gloved, sore, tired, or weak;

(j) to provide a chuck key that, when tethered to a drill's power cord, will naturally come to rest in the palm of the hand while threading either end of the power cord through the hand;

(k) to provide a chuck key that allows for effective chuck operation by insertion of the key into just one of a series of chuck sockets;

(l) to provide a chuck key that allows for a convenient and rapid tightening and loosening of a chuck;

(m) to provide a chuck key that, when untethered from a drill's power cord, can be visibly and securely stored upright in a narrow pocket of a conventional tool pouch; and (n) to provide a chuck key that, when in use, tends to keep the operator's fingers away from the meshing gears of the key and the chuck.

Further objects and advantages are to provide a chuck key that will reduce the threat of the financial burden associated with snag-related injury or property damage, and to reduce the anxiety that can be experienced in anticipation of these occurrences. Still further objects and advantages will become apparent from a consideration of the ensuing description and drawings.

DRAWING FIGURES

REFERENCE NUMERALS IN DRAWINGS

10 circular bevel gear
12 smooth hollow cylindrical handle
14 smooth tethered tubular chuck key holder
16 smooth solid cylindrical handle
18 spindle

DESCRIPTION

Figure 2:
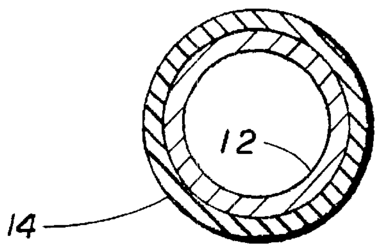
FIG. 2 is an enlarged cross-sectional plan view of one embodiment of FIG. 1 along line 2—2.
Figure 1:
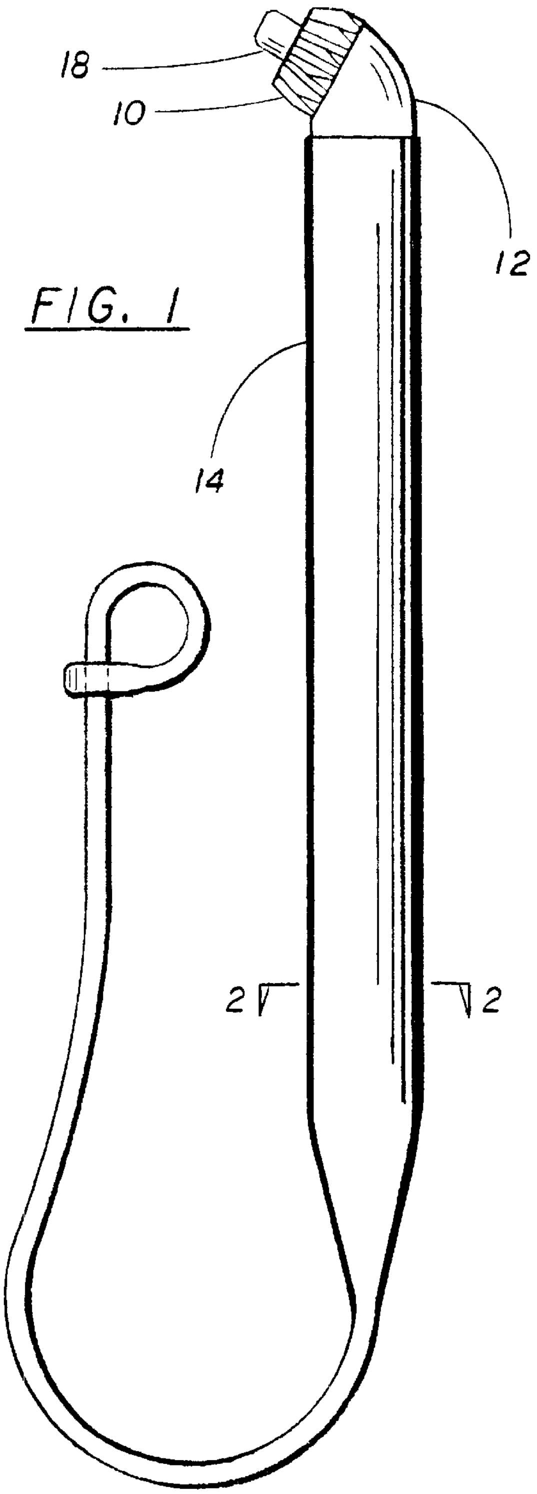
FIG. 1 is a side elevation of a chuck key and its holder, which is made according to and embodies the present invention.
Figure 3:
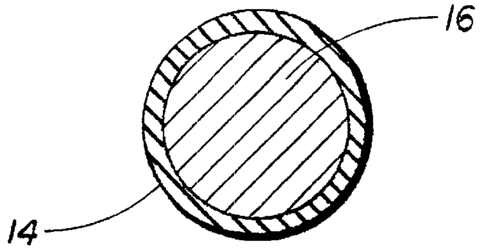
FIG. 3 is an enlarged cross-sectional plan view of another embodiment of FIG. 1 along line 2—2.

FIGS. 1 to 3—Preferred Embodiment

A typical embodiment of the chuck key is illustrated in FIG. 1. The chuck key includes a means for engaging a chuck, preferably comprising a metal circular bevel gear 10 and a spindle 18. The size of the spindle and the gear depend on the size of the chuck (not shown) into which the chuck key is to be engaged.

The chuck key further includes a smooth, elongated, one-piece cylindrical handle 12. The chuck engaging means is rigidly affixed to an abbreviate curved end of the handle, such that the rotational force used to open and close the chuck is generated by rotating the chuck key about spindle 18 by applying pressure along the length of the handle. The axial disposition of the chuck engaging means to the handle is that of an obtuse angle. In the preferred embodiment, this angle is 120 degrees. As illustrated in FIG. 1, the abbreviate curved end of the handle forms the obtuse disposition. The abbreviate curved cylindrical configuration adjacent the chuck engaging means has a virtually zero inside radius, and a positive outside radius equivalent to the diameter of the handle. The outside diameter of handle 12 is equivalent to that of gear 10. In the preferred embodiment, the handle is constructed of a rigid material, such as metal, having sufficient strength that the force necessary to operate the chuck by application of pressure to the handle does not permanently deform or fracture it such that it no longer may be effectively used as a chuck key.

With continuing attention to FIG. 1, the chuck key is shown with a conventional smooth tethered tubular elastomeric chuck key holder 14. A handle receiving tubular portion of the chuck key holder is held in frictional engagement with handle 12. A loop formation on the chuck key holder is for looped constrictive engagement about a power cord of an electric drill (not shown).

An enlarged cross-sectional plan view of FIG. 1 along line 2—2 is shown at FIG. 2 illustrating the preferred embodiment of the chuck key wherein hollow cylindrical handle 12 and the tubular potion of holder 14 are described. FIG. 3 discloses an enlarged cross-sectional plan view of FIG. 1 along line 2—2 illustrating another embodiment of the chuck key wherein a solid cylindrical handle 16 and the tubular portion of holder 14 are described.

While I have shown but two embodiments of the invention, it will be apparent to those skilled in the art that the invention may be embodied still otherwise without departing from the spirit and the scope of the invention.

Operation of Invention

The manner of using the snag-resistant chuck key to operate a drill chuck is similar to that for many chuck keys in present use. Namely, the spindle of key 18 is engaged into one of a series of radial sockets in the body of the chuck (not shown). Simultaneously, bevel gear 10 of the key engages the circular gear of the chuck. Rotating the key about the spindle actuates the jaws of the chuck. Applying pressure along the length of handle 12 generates the rotational force necessary to tighten or loosen the chuck. Continued rotation of the chuck key opens or closes the jaws of the chuck and thereby facilitates changing a tool clamped in the jaws.

The snag-resistant chuck key is attached to an electric drill's power cord (not shown) by way of an elastomeric tethered chuck key holder 14. The chuck key, as well as the power cord and key holder, is dragged over and around obstacles in a work area as the operator repositions or moves to a new location. The smooth shape of the key allows for its unrestricted movement across an encountered obstacle. When the abbreviate curved end of key handle 16 engages an obstacle, and as tensional strain is applied to the tether of holder 14, the chuck key naturally rolls to one side or the other. This latter movement frees the key from a potential snag and promotes generally unrestrained travel about the work area.

Conclusion, Ramifications, and Scope

Accordingly, the reader will see that the snag-resistant chuck key of this invention allows for its snag-resistant movement about a work site when tethered to an electric drill's power cord. This snag-resistance of the chuck key is advantageous in that

- it provides a chuck key that, when tethered to a drill's power cord that must often be pulled, resists the tendency to disturb tools and materials or to pull them off the edge of working platforms;
- it can minimize the possibility of snag related injury;
- it can minimize the possibility of snag related property damage;
- it provides a chuck key that allows for lessened frustration and increased productivity in the absence of repeated snags;
- it can reduce the tendency for the key to drift down the cord away from the operator's reach;
- it can resist the premature tether wear and failure associated with repeated snags; and
- it provides a chuck key that can reduce the threat of the financial loss associated with snag related injury or property damage, and reduce the anxiety that can be experienced in anticipation of these occurrences.

In addition, the snag-resistant chuck key can be used very efficiently to work the jaws of a chuck, can provide effective chuck operation by using the key in just a single socket of the chuck, and can be snugly held in the hand allowing for maximum manipulative leverage when locking and unlocking the chuck. Still other advantages of the chuck key are evident in that

- it provides a chuck key that helps keep the operator's fingers safely away from the moving gears of the key and chuck;
- it can be held and manipulated surely during times when the operator's hands are hampered by the cold or by being gloved;
- it can increase the ability to manage a chuck during times when the operator finds it necessary to work with hands that are sore, tired, or weak;
- it provides a chuck key that, when tethered to a drill's power cord, will come to rest comfortably in the palm as the cord is drawn through the hand; and
- it can, as an alternative, be kept visibly accessible within the operator's tool pouch.

Although the description above contains many specificities, these should not be construed as limiting the scope of the invention, but rather as an exemplification of one preferred embodiment thereof. Many other variations are possible. For example, the tubular handle can have an other-than-round shape such as polygonal, doricly or ionicly fluted, scalloped, tapered, bellied, etc.; the tethered chuck key holder can be any one of the many embodiments of conventional elastomeric chuck key holders, such as tubular or solid, externally or internally engaged to the key handle, tetherless, textured, ribbed, grooved, gripped, bracket or clamp mounted, non-elastomeric, etc.; the bevel gear, spindle, and handle sizes and diameters can vary in relation to the chuck size used; the key holder can be fastened to the key using other means, such as mechanical, adhesive, static, etc.; the key holder can be removable or eliminated; the handle can be constructed of other rigid or semi-rigid material such as fiber reinforced plastic, polyethylene, polypropylene, vinyl, nylon, rubber, various impregnated or laminated fibrous materials, various plastics or plasticized materials, various ferrous and nonferrous metals, various woods, bamboo or other grasses, stone, ivory, bone, etc.; the chuck engaging means can be removably, flexibly, or rotatably affixed to the handle, etc.; the chuck key can be brightly colored for easy identification, etc.

Thus the scope of the invention should be determined by the appended claims and their legal equivalents, rather than by the examples given and the embodiments illustrated.

I claim:

1. A drill chuck key, comprising:

(a) an integrally formed one piece smooth handle having an elongated portion and an abbreviate curved portion, said curved portion turning outwardly from one end of said elongated portion obtusely to the axis thereof, (b) a chuck engaging gear affixed with end of said curved portion, and (c) an elongated elastic member being of tubular construction, said elongated portion of said handle in engagement with one end of said elastic member, said elastic member including a tether at remaining end for gripping the power cord of an electric drill, whereby said smooth handle with said abbreviate curved portion, when tethered to and when trolled from said power cord, cooperate to promote snag-resistant movement of said chuck key across obstacles encountered in a work area.

2. A snag-resistant chuck key of the type for attachment to a power cord serving an electric drill comprising:

(a) an integrally formed one piece handle for holding and operating said chuck key, (b) a smooth elongated portion of said handle for allowing said chuck key to move freely across obstructions without snagging, and for applying torque and providing leverage while using said chuck key, (c) a smooth abbreviate curved portion of said handle for applying torque and providing leverage while using said chuck key, and for allowing said chuck key to roll over and away from obstructions without snagging, said smooth abbreviate curved portion turning outwardly from one end of said smooth elongated portion of said handle obtusely to the axis thereof, (d) a circular bevel gear rigidly affixed to the end of said smooth abbreviate curved portion for engaging a drill chuck to adjust the jaws thereof, diameter of said gear being substantially equal to diameter of said smooth abbreviate curved portion such as to prevent snagging, and (e) a smooth elongated elastic member for attaching said chuck key to said power cord, said elastic member being of tubular construction, said smooth elongated portion of said handle in inserted frictional engagement with one end of said elastic member, said elastic means including tether at remain in end for gripping said power cord of said electric drill, whereby said chuck key, when tethered to and trolled from said power cord, resists snagging on obstacles encountered in a work area.

3. The chuck key of claim 2 wherein said smooth abbreviate curved portion of said handles has a virtually zero inside radius, and a positive outside radius substantially equivalent to diameter of said handle means.

4. A snag-resistant chuck key of the type for attachment to a power cord serving an electric drill comprising:

(a) means for holding and operating said chuck key, (b) means for applying torque and providing leverage while using said chuck key, (c) means for allowing said chuck key to move freely across obstacles, and to roll away from obstructions, without snagging, (d) means for engaging a drill chuck to adjust the jaws thereof, and (e) means for attaching said chuck key to said power cord, whereby said chuck key, when tethered to and trolled from said power cord, resists snagging on obstacles encountered in a work area.

* * * * *